United States Patent

[11] 3,558,921

[72] Inventors Norio Yokozawa
Fuchu-Shi;
Akinao Nara, Hachioji-Shi; Ryoichi Abe,
Kodaira-Shi, Japan

[21] Appl. No. 699,929
[22] Filed Jan. 23, 1968
[45] Patented Jan. 26, 1971
[73] Assignees Hitachi, Ltd.
Tokyo-To, Japan;
Hitachi Electronics Company, Ltd.
Kodaira-shi, Japan
[32] Priority Jan. 23, 1967
[33] Japan
[31] 42/4173

[54] ANALOG SIGNAL CONTROL SWITCH
9 Claims, 7 Drawing Figs.

[52] U.S. Cl. 307/251, 307/237, 330/38
[51] Int. Cl. H03k 17/60
[50] Field of Search 307/251, 205, 279, 304; 330/38(FE)

[56] References Cited

UNITED STATES PATENTS 3,229,218 1/1966 Sickles et al. 307/251X
3,427,445 2/1969 Dailey 307/205X

*Primary Examiner*—John S. Heyman
*Attorneys*—Craig and Antonelli, Paul M. Craig, Jr., Donald R. Antonelli and Stewart & Hill

ABSTRACT: The present invention relates to an improved switch for analogue signal control employing only one insulated-gate field-effect transistor, a so called MOS-type FET device, as the control switching element, having means for electrically separating the substrate of the MOS-type FET device from ground when the device is conducting, and a voltage limiter for limiting the input signal voltage so as to prevent undesirable leakage currents from the source electrode of the FET from flowing through the substrate of the FET device to ground.

PATENTED JAN 26 1971 3,558,921

Figure 1A:
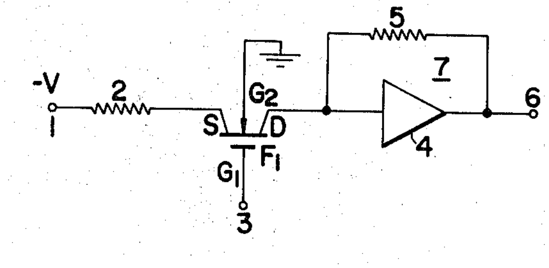
FIG. 1a PRIOR ART

INVENTORS
NORIO YOKOZAWA
AKINAO NARA
RYOICHI ABE

BY Craig & Antonelli

ATTORNEYS

ANALOG SIGNAL CONTROL SWITCH

This invention relates to an improved electronic switch, and more particularly to an improved electronic switch employing an insulated-gate field-effect transistor, therein referred to hereinafter as an "analogue switch." The analogue switch is designated to control an analogue signal in response to an applied control signal.

It is well known that a mechanical switch, such as a relay, has been used widely as an analogue switch having a high accuracy in operation, and has been used particularly as an analogue switch for control elements employed in an analogue computer having low speed and high accuracy in operation, because it is a switch having a large ratio of resistance between the open and closed states thereof. Therefore, the analogue signal transmission circuit utilizing a mechanical switch can be sufficiently separated electrically from the control signal source as to prevent introduction of an error signal from the control source to the analogue signal transmission circuit. However, in the mechanical switch, there has been found unavoidable disadvantages, such as lower speed of operation, lower reliability, lower life, etc., because of the mechanical construction thereof.

On the other hand, for the purpose of eliminating such disadvantages inherent in the mechanical switch, a semiconducting switch element, such as a diode or transistor, has also been employed in the analogue switch. However, employing such a semiconducting switch element has resulted in the appearance of other disadvantages. That is, since it is not possible in a semiconducting switch to sufficiently separate the analogue signal transmission circuit from the control signal source, a relatively large leakage current is generally introduced into the output of the switch even though the switch is open.

The foregoing disadvantages result in a switching operation having a low accuracy. It has, therefore, been suggested to employ the field-effect transistor, commonly referred to as an FET device, in which the leakage current can be maintained at a relatively small value. The FET device is provided in two known types, namely, a junction field-effect transistor, known as a J-type FET device, and an insulated-gate field-effect transistor, known as an MOS-type FET device. The MOS-type FET device has more suitable characteristics for analogue switching than the J-type FET device because the leakage current of about $10^{-14}$ ampere in an MOS-type FET device is very much smaller than that of about $10^{-9}$ $10^{-10}$ in the J-type FET device.

Employing the MOS-type FET device as a switching element, it is therefore possible to eliminate the disadvantage in known arrangements from the standpoint of the large leakage current. However, as will be explained hereinafter, there are still many disadvantages in such an arrangement, for example, restrictions as to the polarity of the input signal voltage, problems relating to a large switching resistance when the switch is closed, and the undesirable limitation on the utilizable level of analogue signal current.

It is therefore an object of the present invention to provide an improved electronic analogue switch employing an MOS-type FET device.

It is another object of the present invention to provide an electronic switch operable in response to both positive and negative input signal voltages.

It is a further object of the present invention to provide an improved switch having a small switching resistance when the switch is closed and also a large resistance when the switch is open.

It is still another object of the present invention to provide a switch employing only one MOS-type FET element and relatively simply designed construction.

It is still a further object of the present invention to provide an electronic switch having relatively high speed, high accuracy and long life.

It is still another object of the present invention to provide an electronic switch operable also for large input analogue signal currents.

Figure 1B:
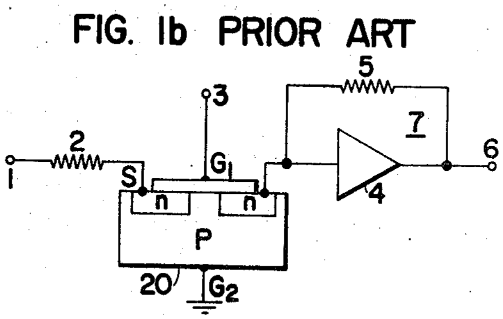
FIG. 1b PRIOR ART
Figure 2:
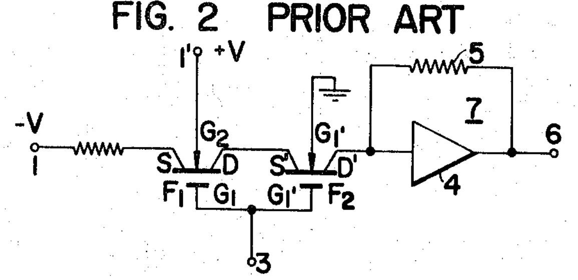
FIG. 2 PRIOR ART
Figure 4A:
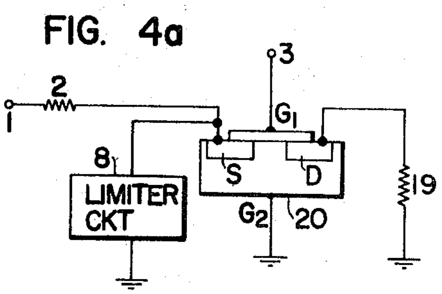
Figures 3, 4B:
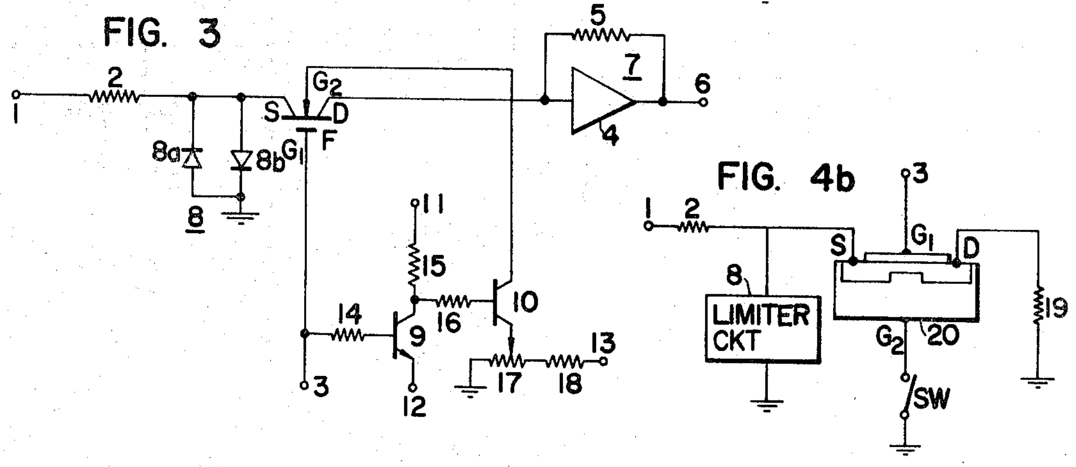
Figure 5:
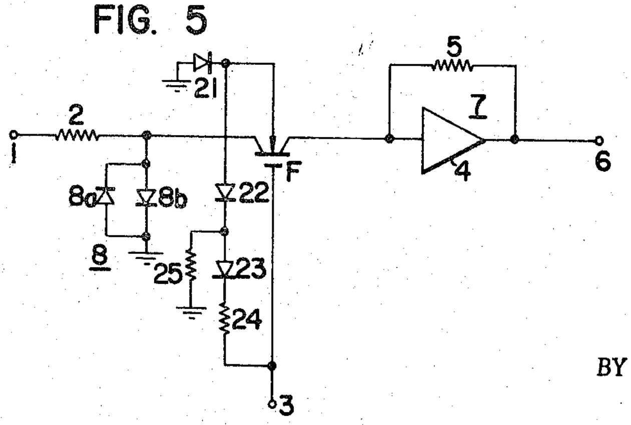

These and other objects, advantages, and novel features of the present invention will be more apparent from the following detailed description when taken in connection with the accompanying drawings, and wherein:

FIGS. 1*a*, 1*b* and 2 show schematic circuit constructions of the electronic switch in accordance with the prior art;

FIG. 3 shows a schematic circuit construction of the electronic switch in accordance with the invention;

FIGS. 4*a* and 4*b* show schematic equivalent circuit constructions for facilitating the explanation of the operation of the switch as shown in FIG. 3; and FIG. 5 shows another embodiment in accordance with the invention.

Referring now more particularly to FIGS. 1*a* and 1*b* which show analogue switch circuits comprising an MOS-type FET device $F_1$, having a source electrode S, a drain electrode D, a first gate electrode $G_1$ and a second gate electrode $G_2$, wherein the source electrode S is connected through an input impedance 2 to an analogue signal input terminal 1, and the drain electrode D is connected through a suitable operational amplifier circuit 7, comprising operational amplifier 4 and feedback resistance 5, to an output terminal 6. The first gate electrode $G_1$ is connected to a control signal input terminal 3 supplied with a control signal from a control source (not shown), and the second electrode $G_2$ is connected to ground. The operational element may be made of any suitable construction in accordance with the predetermined operation, as well known in the art, for example, in an analogue computer.

In operation, where the analogue signal, indicated as —in FIG. 1*a*, is applied through the input terminal 1 and input resistance 2 to the source electrode of transistor $F_1$ and the control signal is impressed through the terminal 3 on the first gate electrode $G_1$ a desirable analogue output signal may be obtained from output terminal 6 via the drain electrode D and the operational circuit 7. In this conventional circuit, since a substrate 20, which is directly connected through the drain electrode D to the operational circuit 7, is grounded through the second gate electrode $G_2$, as shown in FIG. 1*b*, it is possible to decrease the leakage current which flows through the substrate 20 to the operational circuit 7 when the switch is open.

There is however a disadvantage in this known arrangement in that only the negative signal voltage designated −V, as shown in FIG. 1*a*, can be applied to the input terminal 1, a positive signal voltage being not applicable thereto. Moreover, where the input signal current $I_i$ flows through the device $F_1$, which has a channel resistance $R_c$, a voltage drop $E_D = R_c \cdot I_i$ appears between the source electrode S and ground connected to the second gate electrode $G_2$. Therefore, where the voltage drop $E_D$ operates as a forward bias voltage for the P-N junction formed between the substrate, which is a P-type conductor, for example, and the source electrode, which is an N-type conductor, for example, a shunt current appears between the substrate and the source electrode because the substrate is grounded, as mentioned before, and this shunt current results in a large error in switching operation. It may therefore be understood that only a relatively small input signal current, for example about 0.5 milliampere, may be utilized in the arrangement of the prior art without producing a shunt current having a sufficiently large value to disturb the switching operation.

Referring now to FIG. 2, there is shown an analogue switch employing two FET devices $F_1$ and $F_2$, in which a common control signal is applied to both first gate electrodes $G_1$ and $G_1'$ by way of a terminal 3, and a suitable bias voltage is applied to a second gate electrode $G_2$ of device $F_1$. A drain electrode D in device $F_1$ is connected to a source electrode S' in device $F_2$, and a drain electrode D' in device $F_2$ is connected to the operational circuit 7.

As described in connection with FIG. 1, since the substrate of the FET device $F_2$ is grounded, it is possible to decrease the leakage current which flows through the substrate to the operational circuit at the time the switch is open. In addition, it is apparent that provision of an input for positive signals connected to the gate $G_2$ of device $F_1$ in addition to the regular input to the source electrode S, allows switching action in response to signals of either polarity. It is however a disadvantage of this switching circuit that the switching resistance, when the switch is closed, increases to as much as twice the switching resistance of the circuit shown in FIG. 1. It should also be clear that only a relatively small input signal current may be utilized in this case for the same reason as has been described in connection with the prior art shown in FIG. 1.

A switching circuit according to the invention is provided to eliminate the disadvantages mentioned above and make available an excellent switching circuit capable of operating in response to both positive and negative input signals using only a single MOS-type FET device.

Referring now to FIG. 3, there is shown one exemplary embodiment according to this invention comprising an MOS-type FET device F, a transistor switch 9 connected by the base electrode thereof through a resistor 14 to the first gate electrode $G_1$, a transistor switch 10 connected by the collector electrode thereof to the second gate electrode $G_2$ and by the base electrode thereof to the collector electrode of transistor 9 through resistor 16. Resistors 15, 17 and 18, input terminal 11 for connection to a power supply, and input terminals 12 and 13 are provided as a bias voltage supply. A limiter 8, consisting of oppositely poled diodes **8*a* and 8*b*** connected between the source electrode and ground, may be employed as an input voltage limiting circuit.

Now let it be assumed that both the source electrode S and the drain electrode D of the FET device $F_1$ are of N-type construction and the substrate connected to gate electrode $G_2$ of device $F_1$ is of P-type construction, where the control signal voltage impressed on the gate electrode terminal 3 goes sufficiently negative in reference to the voltage at the source electrode S, device $F_1$ is cutoff, transistor 9 is cutoff and transistor 10 conducts. Thus, the substrate of device $F_1$ is grounded through the transistor 10. An equivalent circuit under such conditions is shown in FIG. **4*a* wherein a load resistance 19 is provided as an equivalent resistance of the operational amplifier circuit 7 in FIG. 3, which resistance is formed by the feedback resistance 5 and the internal resistance of operational amplifier 4**, and generally is of low value.

The P-N junction formed with drain electrode D and the substrate 20 may be in a zero-bias condition, and the current through the load resistance 19 would be obtained as the value of voltage in source electrode S divided by the value of a channel resistance between the source electrode S and the drain electrode D under the nonoperating condition of the device $F_1$. In this case, the voltage potential at a connecting point between the input resistance 2 and device $F_1$ may be defined under a value of voltage which corresponds to the limiter circuit 8. That is, in this construction, even though a large input signal voltage is applied to the input terminal 1, the voltage in the source electrode may be made sufficiently low and the current through the resistance 19 sufficiently small that device $F_1$ can be maintained in the cutoff state. Under the condition in which the drain electrode D has the same characteristic relationship to the gate electrode as the source electrode S, the positions of the source S and the drain electrode D may be mutually exchanged.

On the other hand in FIG. 3, in the case where the control signal voltage potential of the terminal 3 goes positive in reference to the voltage of the source electrode S, device $F_1$ conducts, the transistor 9 conducts, and the transistor 10 is cutoff. An equivalent circuit under such conditions is shown as FIG. **4*b*, wherein the substrate 20 of device $F_1$ connected to the gate electrode $G_2$ is isolated from ground, as shown in FIG. 4*b*, by a switch SW. It is one of the advantages of this invention that no shunt current in contrast to prior art arrangements flows through the source electrode S to the substrate regardless of the polarity of the input signal since the substrate is isolated from ground at the time FET device $F_1$ is in operation. Furthermore, since the voltage potential of the connecting point between input resistance 2 and device F is only changed within the voltage drop produced by the internal resistance of device $F_1$ when the device conducts, the limiter element 8**, in this case is held in an open state and all the input signal current flows to the load through FET device $F_1$.

Where the voltage level of the input signal is higher, the operable voltage of the limiter 8 can be higher by use of, for example, suitable series connected limiter elements, such as diodes.

According to the inventor's experiment in connection with this embodiment, undesirable input currents including the shunt current is only about $5\times10^{-12}$ ampere in the off-switch condition, and about $1\times10^{-10}$ ampere in the on-switch condition.

Referring now to FIG. 5, there is shown another embodiment of the invention wherein diodes 22 and 23 are connected in series with resistance 24 between gate electrode $G_2$ and gate electrode $G_1$. Also, a diode 21 is connected between gate electrode $G_2$ and ground. The point of connection of diodes 22 and 23 is connected via resistor 25 to ground.

In operation, where the control voltage potential supplied on terminal 3 goes zero, or more or less positive, in reference with the voltage of the source electrode and thus device $F_1$ conducts, the substrate of the device $F_1$ is actually connected to the point connected between the diodes 21 and 22, both of which are cutoff because of zero bias similarly, and thus the gate electrode $G_2$ is insulated from the ground in the same manner as the operation described in connection with the embodiment of FIG. 3. This embodiment can be more easily obtained with simple construction than that shown in FIG. 3, and it shows an undesirable input current of only about $1\times10^{-9}$ ampere at off-switch operation, and about $1\times10^{-10}$ ampere at on-switch operation.

According to the foregoing explanation, it should be noted that since the substrate is constructed so as to be electrically separated from ground when the device $F_1$ is conducting, it is possible to be operated by both positive and negative input signals while employing only one FET device. It is, furthermore, possible to control relatively large analogue signal currents of about 5 milliampere, which corresponds to 10 times the controllable current in prior art devices. It is therefore noted that such a switch may be used as a control circuit for integrators, a program control circuit for analogue computers, and analogue-to-digital converters as well as a digital-to-analogue converter.

While there has been presented what is at present considered to be the preferred embodiment of the invention, it will be apparent to those of ordinary skill in the art that modifications and changes may be made thereto without departing from the true spirit and scope of the invention.

It will be considered, therefore, that all those changes and modifications which fall fairly within the scope of the invention shall be a part of the invention.

We claim:

1. Analogue signal control switch comprising:
   - an MOS-type FET device having a substrate, a source electrode, a drain electrode, a first gate electrode insulated from the substrate, and a second gate electrode coupled to said substrate;
   - means for supplying analogue input signals to said source electrode;
   - a load connected to said drain electrode;
   - means for supplying a control signal to said first gate electrode so as to effect on-off control of said MOS-type FET device;
   - switching means connected between said second gate electrode and ground for selectively grounding said second gate electrode when turned on; and
   - means responsive to the signal applied to said first gate electrode for turning said switching means off when said FET device is on and on when said FET device is off, respectively.

2. Analogue signal control switch according to claim 1, wherein said switching means is a transistor switching circuit.

3. Analogue signal control switch according to claim 2, which further includes a voltage limiter connected between the source electrode and ground.

4. Analogue signal control switch according to claim 3 wherein said limiter consists of a pair of oppositely poled, parallelly connected diodes which are connected between said source electrode and ground.

5. Analogue signal control switch comprising:

an MOS-type FET device having a substrate, a source electrode, a drain electrode, a first gate electrode insulated from the substrate, and a second gate electrode coupled to said substrate;

means for supplying analogue input signals to said source electrode;

a low impedance load connected to said drain electrode;

means for supplying a control signal to said first gate electrode so as to effect on-off control of said MOS-type FET device;

switching means selectively connecting said second gate electrode to ground for separating said substrate of the FET device from ground only when the FET device is in operation; and wherein said switching means comprises a first and a second transistor, the base electrode of the first transistor being connected through a resistor to signal input means, and the collector electrode of the first transistor being connected through a resistor to the base of the second transistor whose emitter electrode is connected to the substrate of the FET device, and the collector electrode of said second transistor being connected through a resistor to ground.

6. Analogue signal control switch according to claim 5, wherein the impedance load is composed of an operational element.

7. Analogue signal control switch comprising:

an MOS-type FET device having a substrate, a source electrode, a drain electrode, a first gate electrode insulated from the substrate, and a second gate electrode coupled to said substrate;

means for supplying analogue input signals to said source electrode;

a low impedance load connected to said drain electrode;

means for supplying a control signal to said first gate electrode so as to effect on-off control of said MOS-type FET device;

switching means selectively connecting said second gate electrode to ground for separating said substrate of the FET device from ground only when the FET device is in operation; and wherein said switching means consists of diode means responsive to a control signal at said first gate electrode for selectively isolating said second gate electrode from ground.

8. Analogue signal control switch according to claim 7 wherein said diode means consists of at least one diode connected between said first and second gate electrodes.

9. Analogue signal control switch comprising:

an MOS-type FET device having a substrate, a source electrode, a drain electrode, a first gate electrode insulated from the substrate, and a second gate electrode coupled to said substrate;

means for supplying analogue input signals to said source electrode;

a low impedance load connected to said drain electrode;

means for supplying a control signal to first gate electrode so as to effect on-off control of said MOS-type FET device;

switching means selectively connecting said second gate electrode to ground for separating said substrate of the FET device from ground only when the FET device is in operation;

wherein said switching means comprises a series circuit having first diode, second diode and a first resistor, which is connected between the first gate electrode and the second gate electrode of the FET device;

a third diode connected between the second gate electrode and ground; and a resistor connected between the connecting point of said first and second diodes and ground.